United States Patent [19]

Bunyan

[11] Patent Number: 4,762,876

[45] Date of Patent: Aug. 9, 1988

[54] TFE-FREE SEALANT COMPOSITION

[75] Inventor: James L. Bunyan, Akron, Ohio

[73] Assignee: Cajon Company, Macedonia, Ohio

[21] Appl. No.: 84,912

[22] Filed: Aug. 13, 1987

Related U.S. Application Data

[63] Continuation-in-part of Ser. No. 928,821, Nov. 10, 1986, abandoned.

[51] Int. Cl.⁴ .............................................. C08K 5/10
[52] U.S. Cl. ................................. 524/310; 524/314; 524/399; 524/308; 524/400; 524/433; 524/583; 524/586
[58] Field of Search ............... 524/297, 308, 314, 310, 524/399, 400, 433, 583, 586

[56] References Cited

U.S. PATENT DOCUMENTS

| 4,130,213 | 12/1978 | Wszoiek | 524/392 |
| 4,460,737 | 7/1984 | Evans et al. | 524/836 |
| 4,600,745 | 7/1986 | Creighton | 524/433 |

FOREIGN PATENT DOCUMENTS

| 857357 | 12/1970 | Canada | 524/399 |
| 690067 | 4/1953 | United Kingdom | 524/297 |

*Primary Examiner*—Joseph L. Schofer
*Assistant Examiner*—Peter D. Mulcahy
*Attorney, Agent, or Firm*—Fay, Sharpe, Beall, Fagan, Minnich & McKee

[57] ABSTRACT

The present invention provides a novel sealant composition consisting essentially of an admixture of at least one polyolefin resin in particulate form, magnesium oxide, a metal salt of a fatty acid and a suitable liquid carrier. In general, the ingredients are normally present in the range of from about 15 to 25 percent polyolefin, from about 0 to about 6 percent of the metal fatty acid salt, from about 10 to 18 percent magnesium oxide and from about 53 to about 70 percent carrier.

19 Claims, No Drawings

TFE-FREE SEALANT COMPOSITION

This application is a continuation-in-part of application Ser. No. 928,821 filed Nov. 10, 1986, now abandoned.

The present invention relates to sealant compositions of the type employed in conjunction with pipe fittings and more particularly to a tetrafluoroethylene-free (TFE-free) sealant composition believed suitable for use in conjunction with pipes and fittings intended for use in handling tobacco, foods and the like.

Historically, it has been an accepted practice to employ a joint compound or sealant to provide optimum sealing in joining pipes and fittings and the like, particularly, threaded pipes and fittings. Over the past fifty years significant improvements have been made in sealant compositions as the industry has progressed from arrangements as crude as the use of soap and/or string, to more recent times where the sealant has been a carefully formulated admixture of up to a dozen different ingredients. The most popular sealant compositions now in use almost universally contain a tetra-fluoroethylene type of material, most frequently teflon, as one of the basic materials in the formulation.

While relatively small amounts of sealant are employed, it is not unusual for trace amounts of the pipe sealant to reach or migrate to the surface into contact with the materials being handled. Thus, it is possible for a piece of polytetrafluoroethylene to become imbedded in tobacco or food. Then, if the tobacco is smoked or the food cooked or heated up in some way, the polytetrafluoroethylene may break down into very toxic, noxious and poisonous fluorine gas, fluorocarbon and oxyfluorocarbon compounds. This is almost a certainty in tobacco smoking where the temperatures reached are very high. Naturally, tobacco processors have been particularly concerned about this possibility.

In contrast, many non-polytetrafluoroethylene materials and *with certainty* all materials used in the sealant of the present invention, if they reach high temperatures along with tobacco or food, will yield breakdown products no more toxic than those from the tobacco or food itself, i.e. are "non toxic".

Thus, there has long been a desire to find a TFE-free sealant composition; i.e., a sealant composition in which none of the ingredients would be toxic or, like TFE, release toxic and poisonous decomposition products at high temperatures, i.e., up to about 700° F., which would seal immediately, particularly under operating pressures; which would effectively seal in a temperature range from about −65° F. to 300° F. or higher; which would significantly help prevent galling during assembly; and which would effectively protect the parts being joined from corrosion, at least wherever they are covered.

SUMMARY OF THE INVENTION

The present invention provides a novel TFE-free sealant composition consisting essentially of an admixture of at least one polyolefin resin in particulate form, magnesium oxide, a metal salt of a fatty acid and a non-toxic carrier liquid or mixture of such liquids, said admixture having a viscosity greater than about 100,000 centipoise (as measured by ASTM D-1824).

In general, the ingredients are normally present in the following ranges (in parts by weight), from about 15 to 25 percent polyolefin, from about 4 to about 6 percent of the fatty acid salt, from about 10 to 18 percent magnesium oxide, and from about 53 to about 70 percent carrier liquid. The compositions are prepared by a simple addition of the particulate materials to the liquid, followed by mechanical agitation to obtain a uniform admixture. The particles of polyolefin should have a peak diameter (in the statistical sense) in the range of about 0.005 to about 0.03 inches. It will be understood that the particles of polyolefin resin should generally be particulate i.e. spherical or even cubic in configuration, as opposed to long fibrous elements which are generally to be avoided. These compositions may also contain, if desired, additional ingredients such as from about 0.1 to about 10% silica, small quantities of pigment, filler, odorent, viscosity adjuvant, or other optional additives, provided they are also non-toxic as described above.

PREFERRED EMBODIMENT

In the preferred embodiment of the present invention, the liquid carrier is a polymeric plasticizer, or mixture of such plasticizers, generally hydrocarbons having a molecular weight in the range of from about 200 to about 400, and preferably a propylene glycol azelaic acid polymer and is present in a concentration from about 58 to 65 percent by weight; the magnesium oxide is present in a concentration from about 12 to 17 percent weight, the fatty acid salt is a zinc, magnesium, or calcium salt of a fatty acid, most preferably stearic acid, and is present in a concentration from about 4.5 to about 5 percent by weight, and the polyolefin polymer has an average particle size in the range of from about 0.007 to about 0.015 inches in diameter, and is present in an amount of from about 18 to 23 percent by weight. Where the sealed elements (i.e. pipes etc.) are to be employed in handling food, all components of the formulation should be FDA approved for use in such applications.

EXAMPLE I

A sealant composition was prepared by admixing the following ingredients:

|  | FORMULAS 1 & 2 | |
| --- | --- | --- |
|  | 1 | 2 |
| Plastolein 9790[1] Plasticizer | 20 ml | 20 ml |
| MgO | 5 gms. | 3 gms. |
| Zinc Stearate | 1.7 gms. | 0.5 gms. |
| High Density Polyethylene[2] Powder | 6 gms. | 6 gms. |
| AERO (fused Silica) | 0.1 gms. | 0.05 gms. |

[1] A poly (propylene glycol azelaic acid) plasticizer sold by Emery Industries, having a specific gravity of 1.08, a typical viscosity of 16,000 cSt @ 100° F., 970 cSt @ 200° F. (ASTM D 445-65)

[2] HIMONT 1900 ultra high molecular weight polyethylene sold by HIMONT U.S.A., having a typical particle size distribution as described in Table 1 hereafter.

After mixing, Formula 1 was applied to the male threads only of a male/female pair with a small applicator stick and the female joint was connected. Formula 2 had a slightly lower viscosity, which facilitated application by squeezing the composition from a tube directly onto the male threads.

EXAMPLE II

Another composition was prepared as described in Example 1, using the following formulation:

|  | Formula 3 |
| --- | --- |
| Plastolein 9790 | 13 ml |
| Castor Oil | 7 ml |
| MgO | 5 gms. |
| Zinc Stearate | 1.7 gms. |
| Pro-Fax Powder[(3)] Polypropylene | 7 gms. |

[(3)]A high molecular weight crystaline polypropylene having a typical particle size distribution as described in Table 1 hereinafter.

EXAMPLE III

Still another composition was prepared as described in Example I, using the following formulations:

|  | Formulas 4 & 5 | |
| --- | --- | --- |
|  | 4 | 5 |
| Plastolein 9790[(1)] | 20 ml | 20 ml |
| MgO | 5 gms | 5 gms |
| Zinc Stearate | 1.7 gms. | 0 gms |
| Pro-Fax Powder[(3)] Polypropylene | 7 gms. | 7 gms |

TABLE 1

| | Particle Size Distributions | |
| --- | --- | --- |
| SIZE $n \times 10^{-6}$ Meter | 1900 Polyethylene | (Pro-Fax Polypropylene) |
| 300 | 2.6% | 15.6% |
| 250 | 15.9% | 45.7% |
| 212 | 24.6% | 22.2% |
| 180 | 31.0% | 8.9% |
| 150 | 18.1% | 3.0% |
| 125 | 6.5% | 2.0% |
| 106 | 0.9% | 1.0% |
| 90 | 0.4% | .7% |
| 75 | — | .7% |
| 63 | — | .3% |

A series of tests were conducted on the compositions of Example III comparing them with a competitive "food grade" commercial sealant believed to comprise an admixture of mineral oil, polyethylene, mica, a thixotropic agent, silica, titanium dioxide, and teflon.

Each sealant was applied to the male threads of both one inch diameter carbon steel (CS) and ½ inch diameter stainless steel (SS) joints. The results for the sealants of Example III are set forth in Table II below, and those for the commercial sealant are set forth in Table III. Similar test results for Formula 3 are set forth in Table IV.

TABLE II

| | | | Leak Test - Formulas 4 and 5 | | | | |
| --- | --- | --- | --- | --- | --- | --- | --- |
| Test | Sample | Temp. | 300 psi (3 Min.) | 1000 psi (5 Min.) | 3000 psi (8 Min.) | 7000 psi (12 Min.) | Comments |
| 1 | Fit. #22 C.S. 1" | 300° F. | NL | NL | NL | NL | |
| 2 | Fit. #85161 1" CS | 300° F. | NL | NL | NL | NL | |
| 3 | Fit. #85163 | 300° F. | NL | NL | NL | NL | |
| 4 | Fit. #846 | 300° F. | NL | NL | NL | NL | |
| 5 | Fit. #8413 Used ½" SS | 300° F. | NL | NL | NL | NL | |
| 6 | Fit. 5P7/8412 | 300° F. | NL | NL | NL | NL | |
| 7 | Fit. #13 Used ½" SS | 300° F. | NL | NL | NL | NL | |
| 8 | Fit. #16 | 300° F. | NL | NL | NL | | |

It is to be understood that these formulas 4 and 5 were previously effectively tested at lower temperatures: 75° F., 150° F., 200° F. and 250° F.

TABLE III

| | | | LEAK TEST - Commercial Sealant | | | | |
| --- | --- | --- | --- | --- | --- | --- | --- |
| Test # | Fitting Pair | Temp. | 300 psi (3 Min.) | 1000 psi (5 Min.) | 3000 psi (8 Min.) | 7000 psi (12 Min.) | Comments |
| 8 | 22 | 75° F. | NL | NL | GL | — | |
| 9 | 85161 | 75° F. | NL | NL | GL | — | |
| 10 | 85163 | 75° F. | NL | NL | NL | GL | |
| 11 | 846 | 75° F. | NL | NL | NL | GL | |
| 12 | 8413 | 75° F. | NL | NL | NL | GL | |
| 13 | SP7/8413 | 75° F. | NL | NL | GL | — | |
| 14 | 13 | 75° F. | NL | NL | NL | GL | |
| 15 | 16 | 75° F. | NL | NL | NL | GL | |
| 16 | 2 | 75° F. | NL | NL | NL | NL | |
| 17 | 22 | 150° F. | GL | — | — | — | T.E. |
| 18 | 85161 | 150° F. | GL | — | — | — | T.E. |
| 19 | 85163 | 150° F. | GL | — | — | — | T.E. |
| 20 | 846 | 150° F. | — | GL | — | — | T.E./Galled |
| 21 | 8413 | 150° F. | NL | GL | — | — | |
| 22 | SP7/8412 | 150° F. | GL | — | — | — | T.E. |
| 23 | 13 | 150° F. | NL | GL | — | — | |
| 24 | 16 | 150° F. | NL | NL | GL | — | |
| 25 | 2 | 150° F. | NL | GL | — | — | |
| 26 | 8413 | 200° F. | GL | — | — | — | T.E./Galled |
| 27 | 13 | 200° F. | GL | — | — | — | T.E./Galled |
| 28 | 16 | 200° F. | NL | GL | — | — | |

TABLE III-continued

LEAK TEST - Commercial Sealant

| Test # | Fitting Pair | Temp. | 300 psi (3 Min.) | 1000 psi (5 Min.) | 3000 psi (8 Min.) | 7000 psi (12 Min.) | Comments |
|---|---|---|---|---|---|---|---|
| 29 | 2 | 200° F. | GL | — | — | — | T.E. |

- T.E. means "Test Ended."
- Galled Means the Threads are galled and locked together.
- A galled fitting pair is ruined.
- A gross leak at the lowest pressure at a given temperature implies similar leaks at all higher pressures and temperatures. After such a result, the test is ended.

TABLE IV

LEAK TEST - FORMULA 3

| Test # | Fitting Pair | Temp. | 300 psi (3 Min.) | 1000 psi (5 min.) | 3000 psi (8 min.) | 7000 psi (12 Min.) | Comments |
|---|---|---|---|---|---|---|---|
| 31 | 85161 |  | 75° F. | NL | NL | NL |  |
| 32 | 85163 | 75° F. | NL | NL | NL | NL |  |
| 33 | SP7/8412 | 75° F. | NL | NL | NL | NL |  |
| 34 | 2 | 75° F. | NL | NL | NL | NL |  |
| 35 | 85161 | 150° F. | NL | NL | NL | NL |  |
| 36 | 85163 | 150° F. | NL | NL | NL | NL |  |
| 37 | SP7/8412 | 150° F. | NL | NL | NL | NL |  |
| 38 | 2 | 150° F. | NL | NL | NL | NL |  |
| 39 | 85161 | 200° F. | NL | NL | NL | NL |  |
| 40 | 85163 | 200° F. | NL | NL | NL | NL |  |
| 41 | SP7/8412 | 200° F. | NL | NL | NL | NL |  |
| 42 | 2 | 200° F. | NL | NL | NL | NL |  |
| 43 | 85161 | 250° F. | NL | NL | NL | NL |  |
| 44 | 85163 | 250° F. | NL | NL | NL | NL |  |
| 45 | SP7/8412 | 250° F. | NL | NL | NL | NL |  |
| 46 | 2 | 250° F. | NL | NL | NL | NL |  |
| 47 | 85161 | 300° F. | NL | NL | NL | NL |  |
| 48 | 85163 | 300° F. | NL | NL | NL | NL |  |
| 49 | SP7/8412 | 300° F. | NL | NL | NL | NL |  |
| 50 | 2 | 300° F. | NL | NL | NL | NL |  |

It should be noted that all fitting pairs listed in Tables II, III, and IV have been tested many times before with other sealant formulations of various kinds and have been shown to leak every time unless the sealant itself seals the fitting pair. In every case there have been tests in which rather ineffective sealant formulas that did not seal have "proven" these fitting pairs appropriate as tests units. This is an important point, of course, because it is not that hard to find male/female pairs of pipe fittings which fit together so well that they do not leak even with the poorest of sealants! In view of this, in order to assure that the test measured the sealant sample, and not the particular fitting device, many of the fitting devices were tested with each of the sealants, as can be seen from the tables.

While it was originally felt that the zinc stearate of formulae 1 through 4 acted as a lubricant, it has now been found that it acts as a suspension stabilizer, and that it is the concentration of the fatty acid and not the metal concentration which is critical. Further testing then established that magnesium stearate and a calcium stearate gave sealing results equivalent to those achieved with zinc stearate, at various pressures of up to and including 7000 psi.

Formula 5 which was prepared without any zinc stearate functioned just as well as the other formulations as a sealant, but on examining the formulation some time later, it was found that the polyolefin particles had separated out in formala 5 (rising to the top), while formulation 4 remained in suspension. Curiously, it appears that while the polyolefin particles separated out, the other particulate materials appear to have remained in suspension. While the formulation without searate separated out in less than six weeks, metal stearate concentrations of at least about 4% produced suspensions which were stable for over 3 months, and concentrations of 5% provided suspensions which were still stable after 6 months or more.

While not subscribing to any single thing by which the efficacy of the compositions of the present invention might be explained, it would appear that the polyolefin particles help to seal by getting squeezed together between the interstices of the threads and deforming enough to form a blockage, which, though good at all temperatures up to and including 300° F., is actually needed only from 200° F.–300° F. At 200° F. and below, high viscosity alone suffices to seal. With regard to helping to prevent galling, it is believed that the polyolefin particles help to prevent galling simply by helping to keep the metal threads from touching each other. Perhaps equally important are the lubricating properties of the plasticizer.

It is apparent that there has been provided, in accordance with this invention, a process and composition for providing a TFE free sealant which fully satisfies the objectives, means and advantages set forth hereinbefore. While the invention has been described in combination with the specific embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

We claim:

1. A TFE-free sealant composition consisting essentially of an admixture of at least one polyolefin resin in particulate form, magnesium oxide, a metal salt of a fatty acid, and a liquid carrier selected from the group consisting of non-toxic plasticizers and mixtures of two or more such plasticizers, said admixture having a viscosity of at least 100,000 centipoise, and wherein said admixture contains, in parts by weight, from about 15 to 25 percent polyolefin, said polyolefin having particles with an average diameter in the range of about 0.005 to about 0.03 inches, from about 4 to about 6 percent of the metal salt of a fatty acid, from about 10 to 18 percent magnesium oxide and from about 53 to about 70 percent plasticizer; said admixtures containing not more than 10 percent other additives.

2. The compositions according to claim 1, wherein at least a portion of said plasticizer is poly(propylene glycol azelaic acid).

3. The composition according to claim 1, wherein said polyolefin polymer is a high molecular weight polyethylene powder.

4. The composition according to claim 3, wherein said polyolefin polymer is a high molecular weight polyethylene powder.

5. The composition according to claim 1, wherein said polyolefin polymer is a polypropylene powder.

6. The composition according to claim 2, wherein said polyolefin polymer is a polypropylene powder.

7. The composition according to claim 1, wherein said salt of a fatty acid is zinc stearate.

8. The composition according to claim 2, wherein said salt of a fatty acid is zinc stearate.

9. The composition according to claim 1, wherein said salt of a fatty acid is magnesium stearate.

10. The composition according to claim 2, wherein said salt of a fatty acid is magnesium stearte.

11. The composition according to claim 1, wherein said admixture contains, in parts by weight from about 58 to about 65% plasticizer, from about 12 to about 16% magnesium oxide, from about 4.5 to about 5% of said metal salt of a fatty acid, and from about 18 to about 22% polyolefin powder, the particles of said polyolefin powder having a peak diameter in the range of from about 0.007 inches to about 0.015 inches.

12. The compositions according to claim 11, wherein at least a portion of said plasticizer is poly(propylene glycol azelaic acid).

13. The composition according to claim 12, wherein said polyolefin polymer is a high molecular weight polyethylene powder.

14. The composition according to claim 11, wherein said polyolefin polymer is a high molecular weight polyethylene powder.

15. The composition according to claim 11, wherein said polyolefin polymer is a polypropylene powder.

16. The composition according to claim 12, wherein said polyolefin polymer is a polypropylene powder.

17. The composition according to claim 11, wherein said metal salt of a fatty acid is zinc stearate.

18. The composition according to claim 12, wherein said metal salt of a fatty acid is zinc stearate, and said plasticizer having a viscosity sufficient to maintain the admixture as a stable suspension for a period of at least eight days.

19. The composition according to claim 1, wherein said composition also contains from about 0.01 to about 0.5 percent by weight silica.

* * * * *